United States Patent [19]

Gregorutti

[11] Patent Number: 4,665,589

[45] Date of Patent: May 19, 1987

[54] FASTENER FOR OPENABLE AND CLOSABLE SIDE CLIPS OF ANTISKID CHAINS FOR MOTOR VEHICLE TIRES

[75] Inventor: Paolo Gregorutti, Fusine Valromana, Italy

[73] Assignee: Acciaierie Weissenfels S.p.A., Tarvisio, Italy

[21] Appl. No.: 879,983

[22] Filed: Jun. 30, 1986

[30] Foreign Application Priority Data

Apr. 18, 1986 [DE]  Fed. Rep. of Germany ....... 8610680

[51] Int. Cl.[4] ............................................. B60C 27/06
[52] U.S. Cl. .................................. 24/69 TT; 24/605; 152/213 A; 152/242
[58] Field of Search ................... 24/588, 662, 68 CT, 24/68 TT, 69 TT, 116 A, 616, 605, 606, 607, 612; 152/213 A, 242

[56] References Cited

U.S. PATENT DOCUMENTS

| 207,253 | 8/1878 | Chipley | 24/588 |
| 1,258,373 | 3/1918 | Staudinger | 24/69 TT |
| 1,499,667 | 7/1924 | Kies | 24/69 TT |
| 1,681,526 | 8/1928 | Eckroat | 24/69 TT |
| 2,028,288 | 1/1936 | Lenz | 152/242 |
| 2,137,920 | 11/1938 | Manickas | 24/616 |
| 2,233,071 | 2/1941 | Bangs | 24/662 |
| 4,024,607 | 5/1977 | Rosenberg et al. | 24/616 |
| 4,588,010 | 5/1986 | Melzi et al. | 152/213 A |

Primary Examiner—Victor N. Sakran

[57] ABSTRACT

A fastener for openable and closable side clips for antiskid chains for motor vehicle tires is provided, in which to each end of a side clip is fixed an end portion with a platelike body which, in the fitted state of the chain, is oriented substantially parallel to the side of the vehicle tire. There are further provided a hook and a hooking-in opening on each platelike body in such a way that the hook of one body can be brought into operative engagement with the hooking-in opening of the other body in the locking position. Each hook is constructed in the form of a tongue projecting from the plate-like body so as to slope counter to the closing direction.

12 Claims, 4 Drawing Figures

FASTENER FOR OPENABLE AND CLOSABLE SIDE CLIPS OF ANTISKID CHAINS FOR MOTOR VEHICLE TIRES

BACKGROUND OF THE INVENTION

The present invention relates to a fastening or locking device for openable and closable side clips or clamps of antiskid chains for motor vehicle tires, in which to each end of a side clip is fixed an end portion with a platelike body which, in the fitted state, is oriented substantially parallel to the tire side. On each platelike body is formed a hook and a hooking-in opening is provided in such a way that the hook of one body can be hooked into the hooking-in opening of the other body in the locking position.

Numerous fasteners for antiskid chain side clips are known, the construction of the fasteners being in part also dependent on the construction or design of the complete chain or the inner side clip. Thus, e.g. clamping fasteners are known, which are operated from the outside of the tire (clamping chain fasteners). Although in the case of such fasteners there is no need for the operator, after fitting the chain to grasp round the vehicle tire for closing the clip, such fasteners still suffer from the disadvantage that following the first fitting and tightening the vehicle must be moved forward by a small amount and then retightening of the fastener is necessary.

However, other fasteners are known, which do not have to be operated from the outside of the tire and which essentially comprise the provision of two individual end pieces, which positively hook in one another in the fastening position. In the simplest construction, one end piece is constructed as a hook and the plane, within which the hook shape is formed, is directed substantially parallel to the clamping plane of the side clip, whilst the other end piece is in the form of a correspondingly shaped ring, which can be manually hung into the hook. It has already been proposed that the actual hook be constructed as a flat element engaging on the tire side and the hook is also to be provided in the form of a flat element constructed at right angles to the ring plane. However, these known hook fasteners only lead to a reliable fastening or locking action if, on bringing together the two elements, the ring is not located on the back of the hook, because then the desired hooking effect cannot occur and this is certainly possible in the case of incorrect or rash use.

In order to obviate this disadvantage, a hook fastener has already been proposed in which the two end pieces fixed to the ends of the side clip have in each case both a hook and a hooking-in opening, so that it is unimportant during the fastening movement how the two end pieces cover one another in the fastening position. As said end portion can assume the function of a hook and that of a hooking-in opening, a fastening action is always ensured, independently of how the two end pieces are relatively juxtaposed during the fastening movement. In this known fastener, the hooks are constructed in that the body of each end piece is bent over in the form of a hook at its end facing the other end piece, so that when the two end pieces converge during the fastening movement the two hooks run against one another by means of their round front sides and consequently there is a lateral deflection of the hooks in such a way that subsequently the two end pieces perform the remaining fastening movement in juxtaposed manner until the end piece located on the side of the tire engages with its hook in the hooking-in opening formed in the juxtaposed end piece. Although the known fastener operates in a safe and reliable manner, it still has a relatively large overall width. If the latter is to be reduced, configurations are necessary, which require components having relatively complicated shapes leading to a more complicated construction.

As in the development of modern vehicles, there is ever less space between the tire sides on the one hand and other mechanical components of the vehicle on the other, so that for fitting an antiskid chain the fastener of the inner side clip must have a minimum fastener width (i.e. lateral extension away from the tire side), the problem of the present invention is to so further develop a fastener of the aforementioned type that it has a particularly limited width, but still a particularly simple construction.

SUMMARY OF THE INVENTION

According to the invention this problem is solved in the case of a fastener of the aforementioned type in that each hook is constructed in the form of a tongue projecting obliquely from the plate-like body counter to the closing direction of the fastener.

Thus, the fastener according to the invention comprises two plate-like bodies, whose total width (in the sense defined hereinbefore), i.e. the extension thereof laterally away from the tire side is determined by the thickness of the platelike body and the tongue projecting therefrom. As the tongue projects obliquely, it is no longer necessary, as in the case of the fastener used as a basis for the preamble, to bend over an entire portion of the base in hook-like manner. As a result of the tongue configuration sloping counter to the closing direction, it also ensured that during the locking movement during the converging of the two bodies one of these, as a function of the relative position thereof, engages with its front end against the sloping tongue of the other and is deflected by the latter laterally until it engages in the fixing opening on the other body. The fitting of a sloping tongue to the body can be achieved very simply, preferably in that the tongue comprises a body portion tilted in sloping manner from the said body. For this purpose it is merely necessary to prepunch or prestamp the tongue shape in the body and then to bend or tilt the said prepunched or prestamped tongue out of said body corresponding to the desired slope or sloping configuration. Due to the fact that the tongue projects in sloping manner from the body, on introducing the edge of the hooking-in opening in the other body, which is in engaging contact with the tongue, a certain "wedge" effect is brought about on the underside of the tongue, because said edge is drawn into the increasingly narrowing gap between the underside of the tongue and the plane of the body. This leads to a more reliable seating of the fastener and a better security against the undesired opening thereof than when using a hook which is only curved on its inside and which consequently does not have such a "wedge" effect, the said wedge effect on the one hand and the tongue length on the other being optimizable by the choice of an appropriate setting angle for the tongue.

To obtain a relatively large overlap in the hooking-in region, i.e. between the projecting tongue on the one hand and the other body on the other hand so as to bring about a good locating seat, whilst still achieving a very limited fastener width, it is particularly recommended for each tongue to be provided along a first tongue portion emanating from the body with a setting angle to the fastener closing direction which is larger than the setting angle of a following second tongue portion ending in the tongue end. Consequently through the more sharply rising first tongue portion over a short distance the necessary tongue projection for the introduction of the hooking-in opening or its stop edge of the other body can be obtained; this being followed by a second tongue portion which essentially now only serves to cover the inserted portion for good holding purposes. The setting angle of the second portion is much smaller than that of the first portion and is preferably in a range between 0° and 20° (relative to the closing direction of the fastener), so that through said second tongue portion ending in the tongue end a good guidance and supporting or holding of the inserted portion of the other body can be obtained without any significant increase in the fastener width as a result of this overlap. Preferably the rise angle in the first tongue portion, which emanates directly from the body, is in the range 45° to 70°, and particularly preferably is approximately 60°.

In a particularly advantageous construction of the fastener according to the invention, the two end portions are mirror symmetrical to one another. In a particularly preferred manner, each end portion is rendered symmetrical to its longitudinal axis making it possible to use identically constructed end portions.

Preferably the shape of the tongues is such that they have a width decreasing towards the free end thereof, which ensures that in that region which is stressed or loaded most during hooking-in (namely in the starting region behind the projection point on the body) the greatest widths are present, whereas in the end region of the tongue, which only exercises a covering holding function and where no high forces act, a reduced tongue width is sufficient. The width decrease can preferably take place in such a way that (in plan view on each tongue, i.e. in a viewing direction at right angles to the body) the free end of each tongue is rounded and particularly preferably in ellipse segment-shaped manner. This not only leads to an attractive appearance, but unnecessary corners or edges are avoided, which under unfavourable circumstances could lead to an injury risk on operating the fastener.

A particularly preferred construction of the fastener according to the invention can be obtained in that each body is provided at an appropriate point with a permanent magnet on the side on which its tongue is flapped out and in the region which is concealed with the other body in the closed state and the surface of said magnet terminates flush with the surface of the end piece which receives it. This leads to an "attraction" effect, in that in the fastened state the two juxtaposed bodies are drawn against one another by the magnet of the body having the hook for the hooking-in process and consequently a particularly firm seating and good security against undesired opening are obtained.

In another, preferred development of the invention, the fastener can also be constructed in such a way that only one of the two bodies, once again in the region where coincidence with the body takes place in the closed state, is provided with a suitable permanent magnet at an appropriate point and which is on this occasion fixed in such a way in a through opening of the body which receives it, that its two end faces terminate flush with the surfaces of the two side of said body. This magnet can act on both sides of the body, i.e. it is ensured that this magnet, no matter what the position of the body carrying it with respect to the other body (in the fastened position), always acts in such a way that it attracts the two bodies to one another.

The point from which the tongue slopes upwards from the corresponding body can be provided in any desired, suitable position. Thus, under certain circumstances, it can be advantageous if the tongue projects as far as possible at the front end of the associated body, so that the body at the end facing the other body "begins" with the upwardly sloping tongue. However, it may also be desirable to fit the tongue at a certain distance from the front end of the body, particularly if, as stated, the tongue, as a one-piece element of the body, is flapped out of the latter, because as a result there is an adequately large material cross-section between the entry point of the tongue into the body and the corresponding ends to ensure that no undesired tongue damage occurs. It can also be advantageous in this case if the front end of the body is appropriately rounded even over and beyond the plate thickness, so that the front body ends running against one another on fastening can also be laterally deflected. The construction of the front end of each body, like that of the tongue (viewed in vertical plan view on the body) is preferably rounded, so as to avoid undesired edges and consequently possible injury risks for the operator, whilst in particular during the converging of the bodies during the closing or fastening process to prevent the two bodies from stopping with their front ends engaging on one another.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
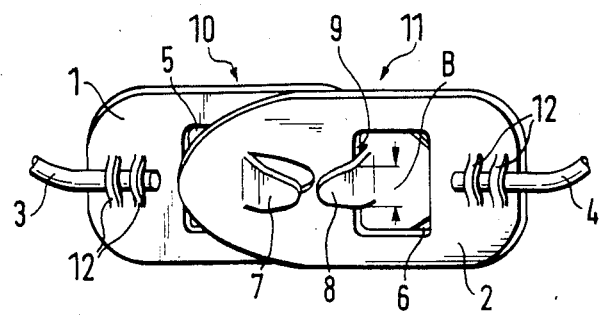
FIG. 1, a fastener according to the invention in the closed or fastened position (in perspective plan view).

FIG. 1 shows a fastener in the closed or fastened position with two end pieces 10, 11, whereof each is attached by means of suitable attachments 12 to the ends 3 or 4 of side clips of not shown antiskid chains. All appropriate attachment means and attachment types, which are known to the Expert and which do not therefore have to described in detail can be used for attachment 12.

Figure 2:
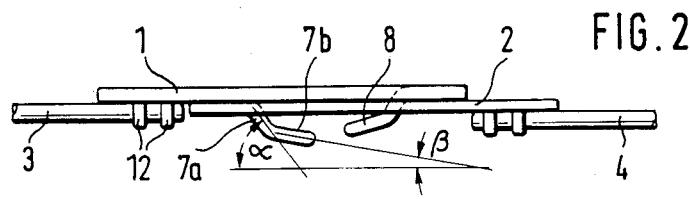
FIG. 2, a plan view of the fastener shown in FIG. 1 (viewing direction turned by 90°).

Each of the two end pieces 10, 11 has a platelike body 1, 2 which, at its end remote from the attachments 12, is provided with a rounded and in the represented embodiments oval shape C when considered in plan view. At a certain distance from said end of each platelike body 1, 2 is provided a tongue 7, 8 sloping counter to the particular closing direction of the particular end piece 10, 11. As can be gathered from the drawings, said tongues 7, 8 comprise a portion of the particular body 1, 2, which was prestamped or prepunched in the body and then pivoted or swung in tongue-like manner from the plane of the body in the represented manner. As shown in FIG. 2, tongue 7 (and the same applies to tongue 8) is initially set at an angle α in a first portion 7a, which directly emanates from the entry point into the body. To this first portion 7a is connected a second portion 7b, which ends in the free end of the tongue and is set at a much smaller angle β, so that a "stepped" setting according to FIG. 2 is obtained and express reference is made thereto. Angle α is preferably in a range from approximately 45° to 75°, whilst angle β is only in the range 0° to 20°.

Figure 3:
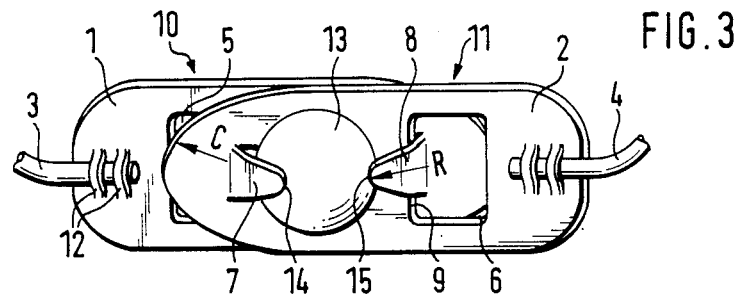
FIG. 3, another embodiment of a fastener according to the invention with permanent magnets (in closed or fastened position).

As is clearly shown in the drawings, tongues 7, 8 are in plan view such that their width B (cf FIG. 1) decreases continuously up to the particular tongue end 14, 15 (FIG. 3) and in plan view each tongue end 14, 15 is rounded and preferably ellipse segment-shaped, as indicated by arrow R in FIG. 3.

The drawings also show that, apart from tongues 7,8, in each platelike body 1,2 is provided a hooking-in opening 5, 6. In the closed or fastened position, the relative position of the two end pieces 10, 11 shown in the drawings occurs but, considered in the viewing direction of the observer of the drawings, end piece 11 could be to the rear and end piece 10 to the front. In all cases it is ensured that the rear end piece (end piece 10 in the drawings), which engages on the not shown tire side and over which is engaged the antiskid chain provided with said fastener, passes by means of its tongue (tongue 8 in the represented case) through the corresponding hooking-in opening 6 of the other end piece 11. Under the opening tension of the side clip, there is an engagement of the terminal edge 9 of opening 6 facing the particular tongue 8 against the underside of the latter, so that the desired locking engagement occurs.

Figure 4:
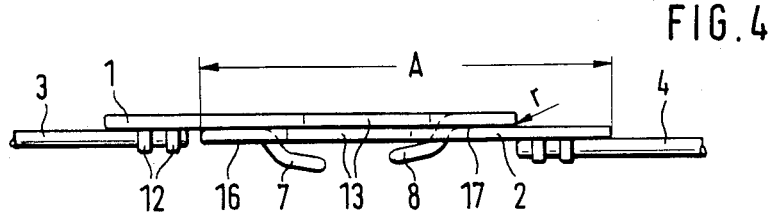
FIG. 4, a plan view of the fastener of FIG. 3 (view direction turned by 90°).

In the embodiment shown in FIGS. 3 and 4, in addition to what is shown in FIGS. 1 and 2, on each end piece 10, 11 is provided a permanent magnet 13 (only shown for end piece 11 in FIGS. 3 and 4), namely within the region A (cf FIG. 4), within which the two end pieces 10, 11 coincide in the closed position. Permanent magnets 13 are inserted in an appropriate position between the tongue 7 or 8 and the hooking-in opening 6 of the particular body 1 or 2 in a reception opening and are fixed, e.g. bonded therein. Permanent magnet 13 is positioned as close as possible to the point at which the particular tongue 7 or 8 passes out of the plane of the body, so that in the closed or fastened position a particularly good engagement of the two end pieces 10, 11 with one another is ensured in the tongue region. Permanent magnets 13 are embedded in the particlar body 1 or 2 in such a way that their surface terminates flush with the corresponding surface 16 or 17 of the two plate-like bodies 1 or 2 and does not project.

As can also be seen in FIG. 4, body 1 or 2, also with respect to its thickness, is provided at its free ends with a rounded portion, end pieces 10, 11 having a configuration such that edges or corners are avoided.

The bodies can be made from any suitable sheet steel with corresponding dimensions, but can also be made from light metal or other suitable materials. The Expert is well aware of the materials which can be used and he will choose them accordingly.

What is claimed is:

1. A fastener for openable and closable side clips for motor vehicle tire antiskid chains and comprising platelike bodies of substantially identical outer contour and having longitudinal axes and fixed to ends of said clips, which bodies in the fitted state are oriented substantially parallel to a blind side of the vehicle tire, each platelike body being formed intermediate opposite ends thereof with a struck out hook and a hooking-in opening, said hook and hooking-in opening of each platelike body being symmetrically formed along and about said longitudinal axes of said bodies, said hook on each platelike body being in form of a tongue obliquely projecting from the platelike body in a direction counter to the closing direction of the fastener, said platelike bodies, on a side of said hooks most distant from said hooking-in openings, and said hooks and hooking-in openings therein being shaped and oriented to ensure guided hooking-in engagement of at least one of the hooks of one of the bodies in the hooking-in opening of an other of said bodies during closing action of the fastener, said guided action occurring during said closing action when an end portion of one of the platelike bodies, nearest said struck out hook therein, contacts and rides on the obliquely projecting tongue in an other of the platelike bodies until a leading edge of the hooking-in opening of said one platelike body, considered in relation to the closing direction of the closing action, clears said hook of said other of said platelike bodies for interlocking engagement of said platelike bodies.

2. A fastener according to claim 1, wherein the tongue of each of the platelike bodies comprises a sloping struck-out portion of the body.

3. A fastener according to claim 1, wherein the tongue has first and second sloping portions, said first sloping portion being at an angle relative to the body from which it is struck, greater than the angle formed between an extension of the second portion with said body.

4. A fastener according to claim 3, wherein the angle of the second portion is from 0° to 20°.

5. A fastener according to claim 1, wherein the platelike bodies are fixed to said clips in complementary mirror-image fashion.

6. A fastener according to claim 1, wherein each tongue has a width which continuously decreases towards its free end.

7. A fastener according to claim 1, wherein the free end of the second sloping portion of each tongue is rounded.

8. A fastener according to claim 7, wherein the second sloping portion has an elliptic segment shape.

9. A fastener according to claim 7, wherein longitudinal axes of said bodies are in alignment and the free ends of the second sloping portion of the tongues of said bodies are in facing relation in the fitted state of the fastener.

10. A fastener according to claim 1, wherein each body is provided with a permanent magnet on the side on which the tongue is struck-out and within a region coinciding with the other body in the closed state of the fastener, the surface of said permanent magnet terminating flush with the surface of the platelike body receiving it.

11. A fastener according to claim 1, wherein only one body has a permanent magnet within the region coinciding with the other body in the closed state of the fastener, said permanent magnet being fixed in an opening in the body receiving it with its two end faces terminating flush with the surfaces of both sides of said body.

12. A fastener according to claim 1, wherein said platelike bodies in their fitted state overlap for a major part of their length with their longitudinal axes in alignment.

* * * * *